(12) United States Patent
Sassi et al.

(10) Patent No.: US 11,707,973 B2
(45) Date of Patent: Jul. 25, 2023

(54) CABLE REINFORCEMENT FOR VEHICLE DOORS

(71) Applicant: Ford Global Technologies, LLC, Dearborn, MI (US)

(72) Inventors: Abdelmonaam Sassi, Windsor (CA); Joseph E. Abramczyk, Farmington Hills, MI (US); Jamil M. Alwan, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/329,760

(22) Filed: May 25, 2021

(65) Prior Publication Data

US 2022/0379692 A1    Dec. 1, 2022

(51) Int. Cl.
*B60J 5/04*    (2006.01)
*B62D 25/04*    (2006.01)

(52) U.S. Cl.
CPC .............. *B60J 5/044* (2013.01); *B62D 25/04* (2013.01)

(58) Field of Classification Search
CPC . B60J 5/044; B60J 5/042; B60J 5/0427; B60J 5/0456; B60J 5/0459; B60J 5/0461; B62D 25/04

USPC ......................................... 296/146.6, 187.12
See application file for complete search history.

(56) References Cited

U.S. PATENT DOCUMENTS 9,340,241 B2 *   5/2016  Okamura ............... B62D 37/00
10,106,212 B2 * 10/2018  Andersen ............... B62D 39/00

FOREIGN PATENT DOCUMENTS

| CN | 112721857 A | * | 4/2021 | ......... B60R 22/1951 |
|---|---|---|---|---|
| DE | 19642686 C1 | | 10/1996 | |
| DE | 102014201527 A1 | | 7/2015 | |
| JP | 2006175949 A | | 7/2006 | |
| WO | 2020108859 A1 | | 6/2020 | |

* cited by examiner

*Primary Examiner* — Dennis H Redder
(74) *Attorney, Agent, or Firm* — Frank A. MacKenzie; Bejin Bieneman PLC

(57) ABSTRACT

A vehicle includes a first pillar and a second pillar spaced from the first pillar along a vehicle-longitudinal axis. A rotational actuator is disposed at the first pillar. The rotational actuator is fixed relative to the first pillar. A cable is engaged with the rotational actuator and is elongated along the vehicle-longitudinal axis to the second pillar. The cable is moveable to a deployed position by the rotational actuator and is under tension in the deployed position.

19 Claims, 9 Drawing Sheets

CABLE REINFORCEMENT FOR VEHICLE DOORS

BACKGROUND

Vehicles may be subject to crash tests. Vehicle structural performance and occupant injury values are assessed using standardized protocols in these crash tests. Such tests may be standardized by various governmental or industry organizations. Some test, for example, measure the door intrusion and/or the movement of vehicle occupants during vehicle impacts that move the vehicle occupants in cross-vehicle directions. These tests include moving deformable barrier side impact tests and side oblique impact tests. For example, FMVSS 214 mandates static door intrusion requirement and dynamic impact limits on occupants of a vehicle. Some public domain organizations such as IIHS also test for kinematic control of occupants during dynamic side impacts.

DETAILED DESCRIPTION

Figure 1:
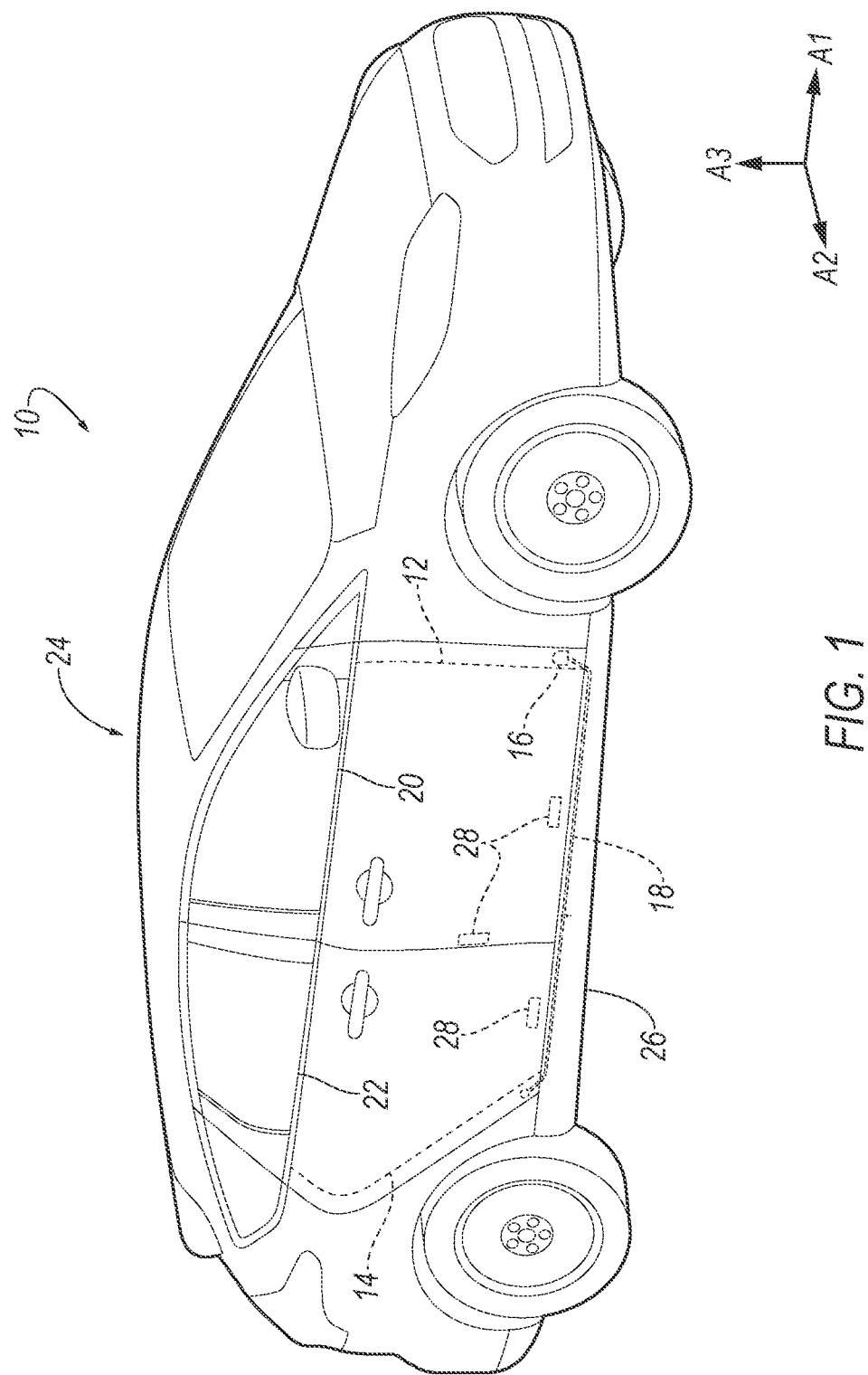
FIG. 1 is a perspective view of a vehicle including an exemplary cable reinforcement shown in hidden lines including a cable and a rotational actuator engaged with the cable.

A vehicle includes a first pillar and a second spaced from the first pillar along a vehicle-longitudinal axis. A rotational actuator is disposed at the first pillar. The rotational actuator is fixed relative to the first pillar. A cable is engaged with the rotational actuator and is elongated along the vehicle-longitudinal axis to the second pillar. The cable is moveable to a deployed position by the rotational actuator and is under tension in the deployed position.

The vehicle may include a second rotational actuator disposed at the second pillar and fixed relative to the second pillar. The cable may be engaged with the second rotational actuator.

The rotational actuator and the second rotational actuator each may include an electric motor.

The rotational actuator and the second rotational actuator each may include a pyrotechnic charge.

The vehicle may include a sensor and a computer in communication with the sensor. The computer may have a processor and a memory storing instructions executable by the processor to control actuation of the rotational actuator and the second rotational actuator based on the sensor detecting a pre-impact. The instructions may include instructions to control actuation of the rotational actuator and the second rotational actuator based on the sensor not detecting an impact.

The cable may include an end disposed at the second pillar. The end may be fixed relative to the second pillar.

The vehicle may include a rocker extending from the first pillar to the second pillar, and a secondary cable extending from the rocker to the cable.

The secondary cable may include a first end fixed relative to the rocker and a second end engaged with the cable.

The secondary cable may be disposed equidistant from the first pillar and the second pillar.

Then the cable is in the deployed position, the secondary cable may extend generally perpendicular to the cable.

The rotational actuator may be configured to release tension in the cable.

The vehicle may include two moveable pulleys each engaged with the cable. Each moveable pulley may be disposed at one respective pillar and may be configured to guide the cable to a stowed position when the rotational actuator releases tension in the cable.

Each moveable pulley may include a spring mounted to the respective pillar. The springs may be configured to bias the moveable pulleys towards the stowed position.

When the cable is in a stowed position, tension in the cable may be relaxed relative to tension when the cable is in the deployed position.

The vehicle may include a sensor and a computer in communication with the sensor. The computer may have a processor and a memory storing instructions executable by the processor to control actuation of the rotational actuator based on the sensor detecting a pre-impact. The instructions may include instructions to control actuation of the rotational actuator based on the sensor not detecting an impact.

The cable in the deployed position may extend along an axis generally parallel to the vehicle-longitudinal axis.

The rotational actuator may include an electric motor.

The rotational actuator may include a pyrotechnic charge.

With reference to the Figures, wherein like numerals indicate like parts throughout the several views, a vehicle 10 is generally shown. The vehicle 10 includes a first pillar 12 and second pillar 14 spaced from the first pillar 12 along a longitudinal axis A1. A rotational actuator 16 is disposed at the first pillar 12. The rotational actuator 16 is fixed relative to the first pillar 12. A cable 18 is engaged with the rotational actuator 16 and is elongated along the longitudinal axis A1 to the second pillar 14. The cable 18 is moveable to a deployed position by the rotational actuator 16 and is under tension in the deployed position.

The vehicle 10 may include one or more doors, e.g., a front door 20 and/or a rear door 22, between the first pillar 12 and the second pillar 14. As one example, the vehicle 10 may include one door 20, 22 between the pillars 12, 14. As another example, the vehicle 10 may include two doors 20, 22 between the pillars 12, 14. In such an example, the vehicle 10 may have a B-pillarless configuration. In other words, the vehicle 10 does not include a pillar between a front door 20 and a rear door 22. Since the cable 18 extends from the first pillar 12 to the second pillar 14, i.e., across the front and rear doors 20, 22, activation of the rotational actuator 16 tensions the cable 18 between the first pillar 12 and the second pillar 14. During a side impact, the cable 18 can distribute a force from the side impact to the first pillar 12 and the second pillar 14. Distributing the force to the pillars 12, 14 of the vehicle 10 provides reinforcement to the front and rear doors 20, 22 during a side impact. Additionally, using a rotational actuator 16 to tension the cable 18 can satisfy packaging constraints within the vehicle 10 and can allow tension in the cable 18 to be adjusted, as discussed below.

With reference to FIG. 1, the vehicle 10 may be any type of passenger or commercial automobile such as a car, a truck, a sport utility vehicle, a crossover, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

The vehicle 10 defines the longitudinal axis A1, e.g., extending between a front and a rear of the vehicle 10. The vehicle 10 defines a lateral axis A2, e.g., extending between a left side and a right side of the vehicle 10. The vehicle 10 defines a vertical axis A3, e.g., extending between a roof and a floor of the vehicle 10. The longitudinal axis A1, the lateral axis A2, and the vertical axis A3 are perpendicular to each other.

The vehicle 10 includes a frame (not numbered) and a body 24. The frame may be of a unibody construction in which the frame is unitary with the body 24 (including frame rails, pillars 12, 14, roof rails, etc.). As another example, the body 24 and frame may have a body-on-frame construction (also referred to as a cab-on-frame construction) in which the body 24 and frame are separate components, i.e., are modular, and the body 24 is supported on and affixed to the frame. Alternatively, the frame and body 24 may have any suitable construction. The frame and body 24 may be of any suitable material, for example, steel, aluminum, and/or fiber-reinforced plastic, etc.

The body 24 defines a passenger compartment (not numbered) to house occupants, if any, of the vehicle 10. The passenger cabin includes a front end (not numbered) and a rear end (not numbered) with the front end being in front of the rear end during forward movement of the vehicle 10. The vehicle 10 includes one or more seats (not shown). The vehicle 10 may include any suitable number of seats. The seats may be arranged in the passenger cabin in any suitable position, i.e., as front seats, rear seats, third-row seats, etc. The seats may be movable relative to the floor to various positions, e.g., movable fore-and-aft and/or cross-vehicle. The seats may be of any suitable type, e.g., a bucket seat.

As set forth above, the vehicle 10 may be B-pillarless, as shown in FIG. 1. Specifically, the body 24 may be B-pillarless. In such an example, the body 24 may define one door opening that receives two doors, e.g., the front door 20 and the rear door 22. Specifically, the first pillar 12 and the second pillar 14 are on opposite sides of the one door opening. That is, the first pillar 12 and the second pillar 14 are spaced from each other by the one door opening. One of the pillars 12, 14 is disposed at the front end of the passenger cabin and may be referred to as an "A-pillar." Additionally, the other of the pillars 12, 14 is disposed at the rear end of the passenger cabin and may be referred to as a "C-pillar." The body 24 may not include a pillar between the first pillar 12 and the second pillar 14, i.e., a "B-pillar." In the examples shown in the Figures, the first pillar 12 is the A-pillar, and the second pillar 14 is the C-pillar. In an alternative example, the first pillar 12 is the C-pillar, and the second pillar 14 is the A-pillar.

Alternatively, the body 24 may include a B-pillar, i.e., the body 24 may define two door openings that each receives one of the front door 20 or the rear door 22. In such an example, the pillars 12, 14 are spaced from each other by at least one of the door openings. That is, one of the pillars 12, 14 is one of the A-pillar or the C-pillar. The other of the pillars 12, 14 is the B-pillar or the other of the A-pillar or the C-pillar.

The front door 20 may be hinged to the A-pillar of the body 24. For example, the front door 20 may include hinges (not shown) at a vehicle-forward end of the front door 20 that couple the front door 20 to the A-pillar. The rear door 22 may be hinged to the C-pillar of the body 24. For example, the rear door 22 may include hinges (not shown) at a vehicle-rearward end of the rear door 22 that couple the rear door 22 to the C-pillar. The doors 20, 22 meet at a location between the pillars 12, 14 and may releasably latch to each other.

The body 24 may include a rocker 26 elongated along the longitudinal axis A1, i.e., from the first pillar 12 to the second pillar 14. The rocker 26 is the lowest portion of a side of the vehicle 10. The rocker 26 provides rigidity at the side of the vehicle 10. The rocker 26 supports vehicle 10 components, such as a floor, doors 20, 22, pillars 12, 14, etc. The rocker 26 may define a lower boundary of the one door opening.

With continued reference to FIG. 1, each door 20, 22 and the rocker 26 may include a latching assembly 28 for latching the respective door 20, 22 to the body 24. For example, the latching assembly 28 may include a striker on the rocker 26 and a latch on the door 20, 22 that releasably engages the striker. In the example shown in FIG. 1, the vehicle 10 with the B-pillarless configuration includes a latching assembly 28 for both the front door 20 and the rear door 22. Additionally, the doors 20, 22 may include a latching assembly 28 for latching the doors 20, 22 to each other. For example, the latching assembly 28 may include a striker on one door 20, 22 and a latch on the other door 20, 22 that releasably engages the striker.

Figure 3A:
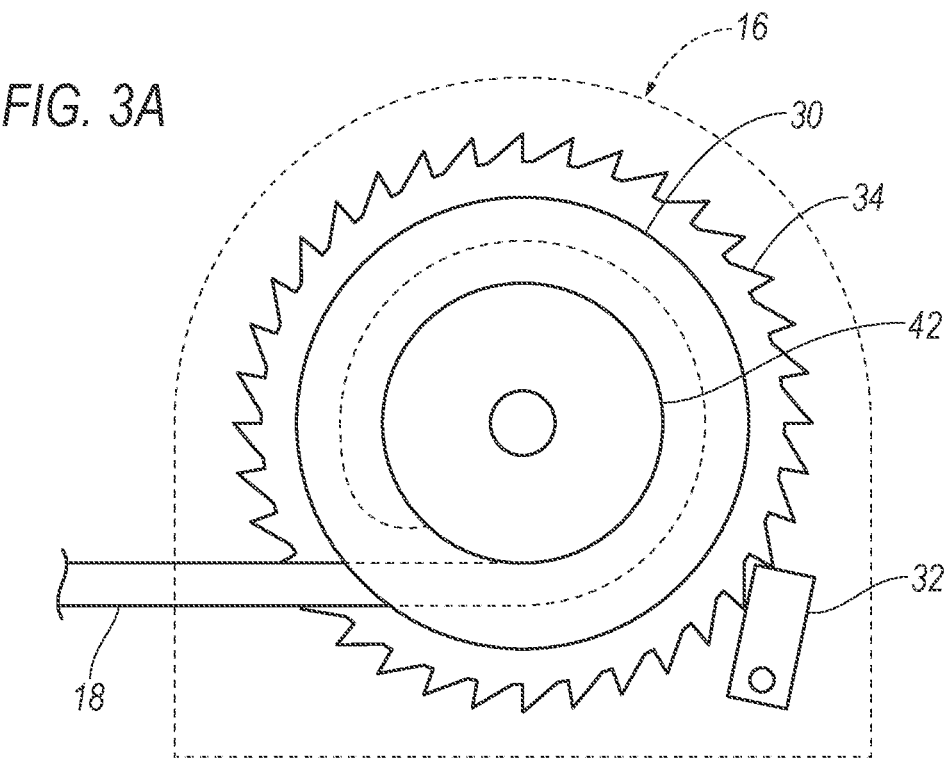
FIG. 3A is a side view of an exemplary rotational actuator including a motor.
Figure 3B:
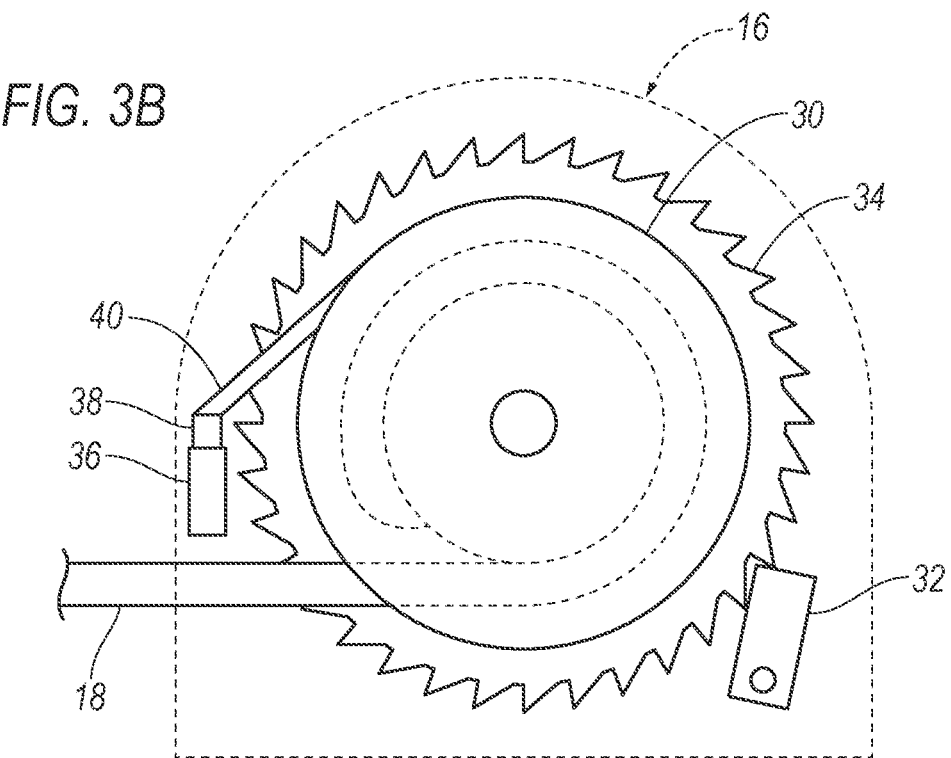
FIG. 3B is a side view of an exemplary rotational actuator including a pyrotechnic charge.

The rotational actuator 16 is supported by the first pillar 12. For example, the rotational actuator 16 may be mounted to the first pillar 12. For example, the rotational actuator 16 may include locating elements, fasteners, etc., that engage the first pillar 12. Additionally, or alternatively, fasteners may engage the rotational actuator 16 and the first pillar 12 to mount the rotational actuator 16 to the first pillar 12. Additionally, the rotational actuator 16 is engaged with the cable 18. As an example, the rotational actuator 16 may include a drum 30 rotatable about an axis (not shown), as shown in FIGS. 3A and 3B. One end of the cable 18 may be connected to the drum 30, e.g., via fasteners, welding, adhesive, etc.

Figure 2A:
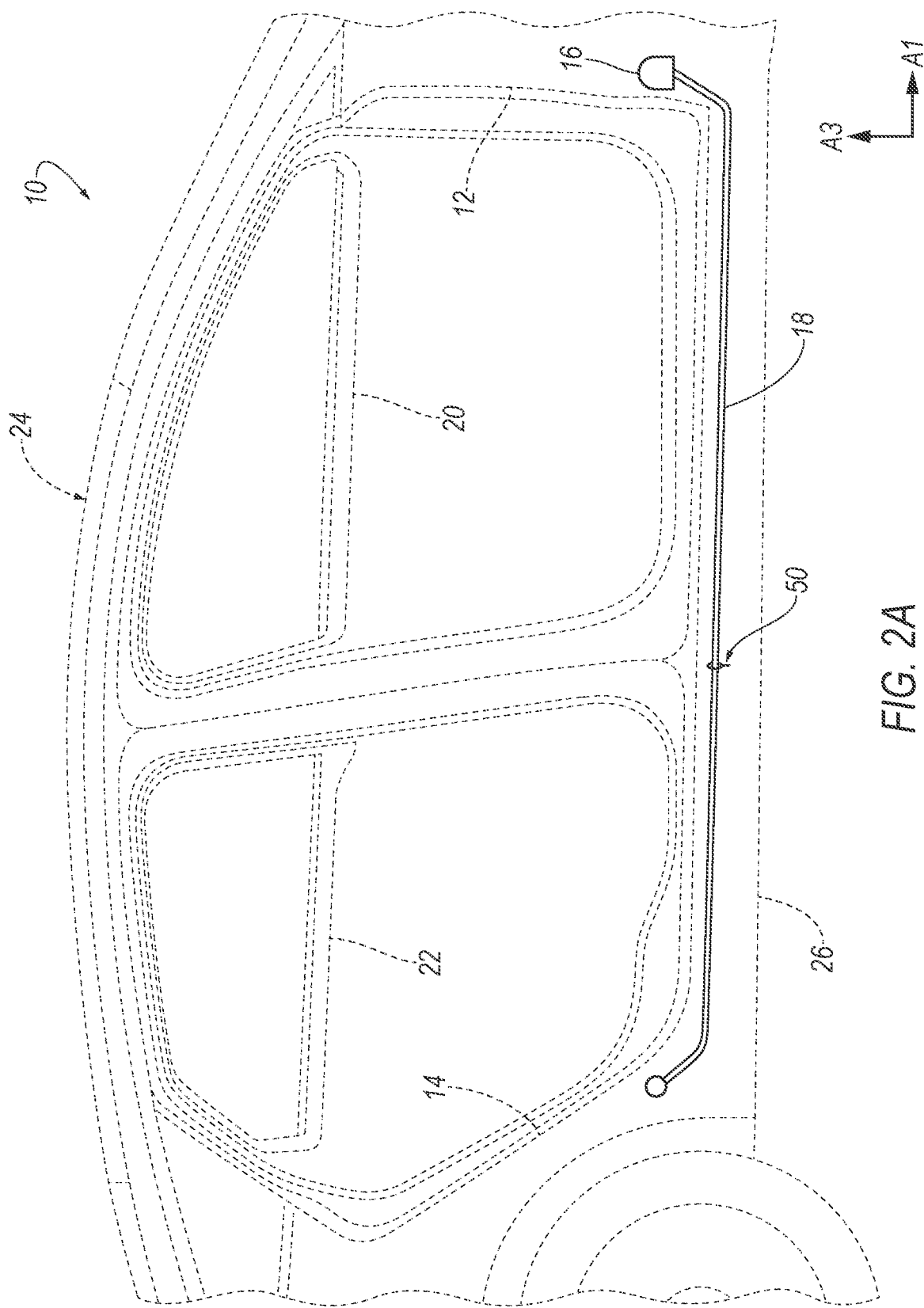
FIG. 2A is a side view of the vehicle including a cable in a stowed position.
Figure 2B:
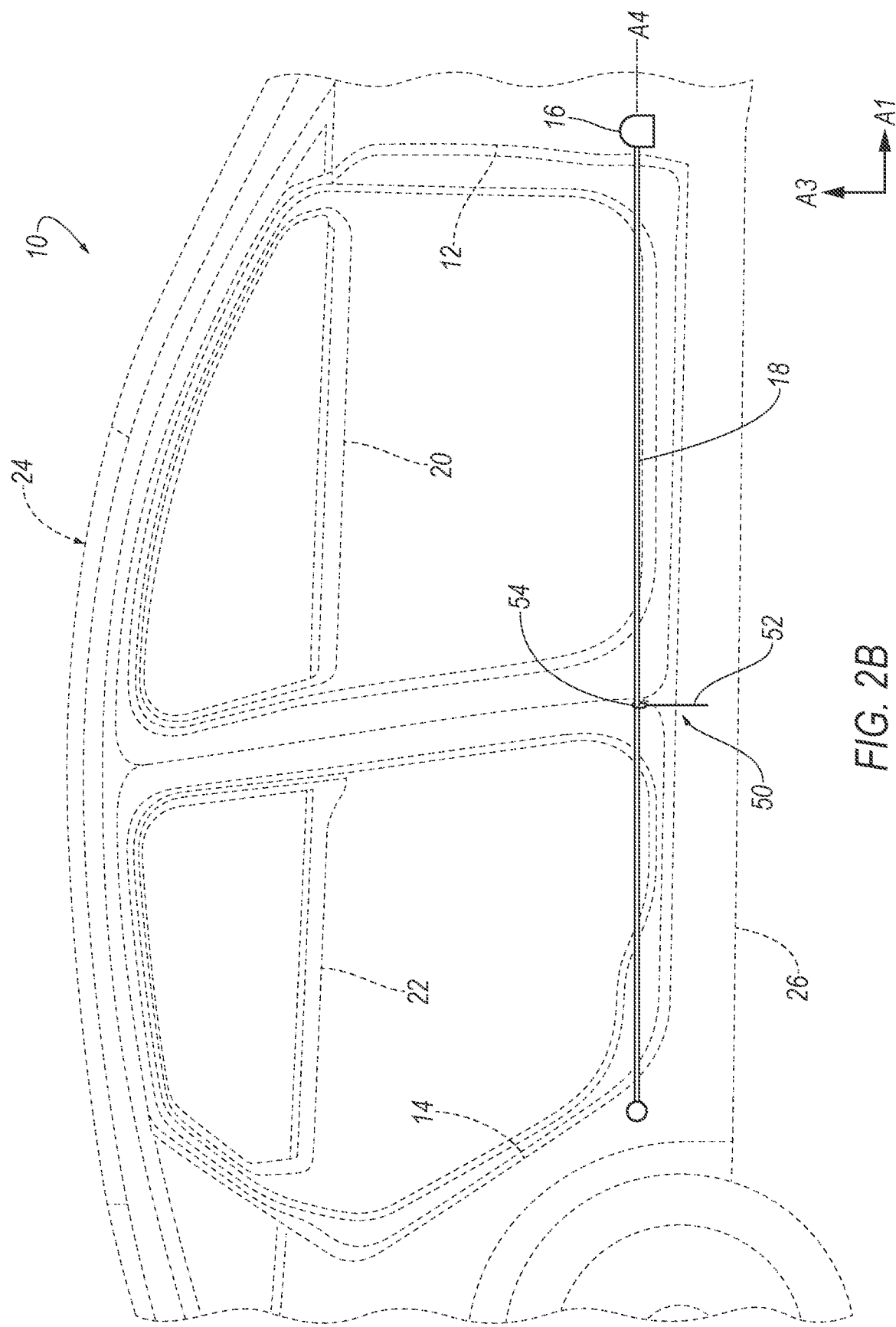
FIG. 2B is a side view of the vehicle including the cabled in a deployed position.
Figure 4A:
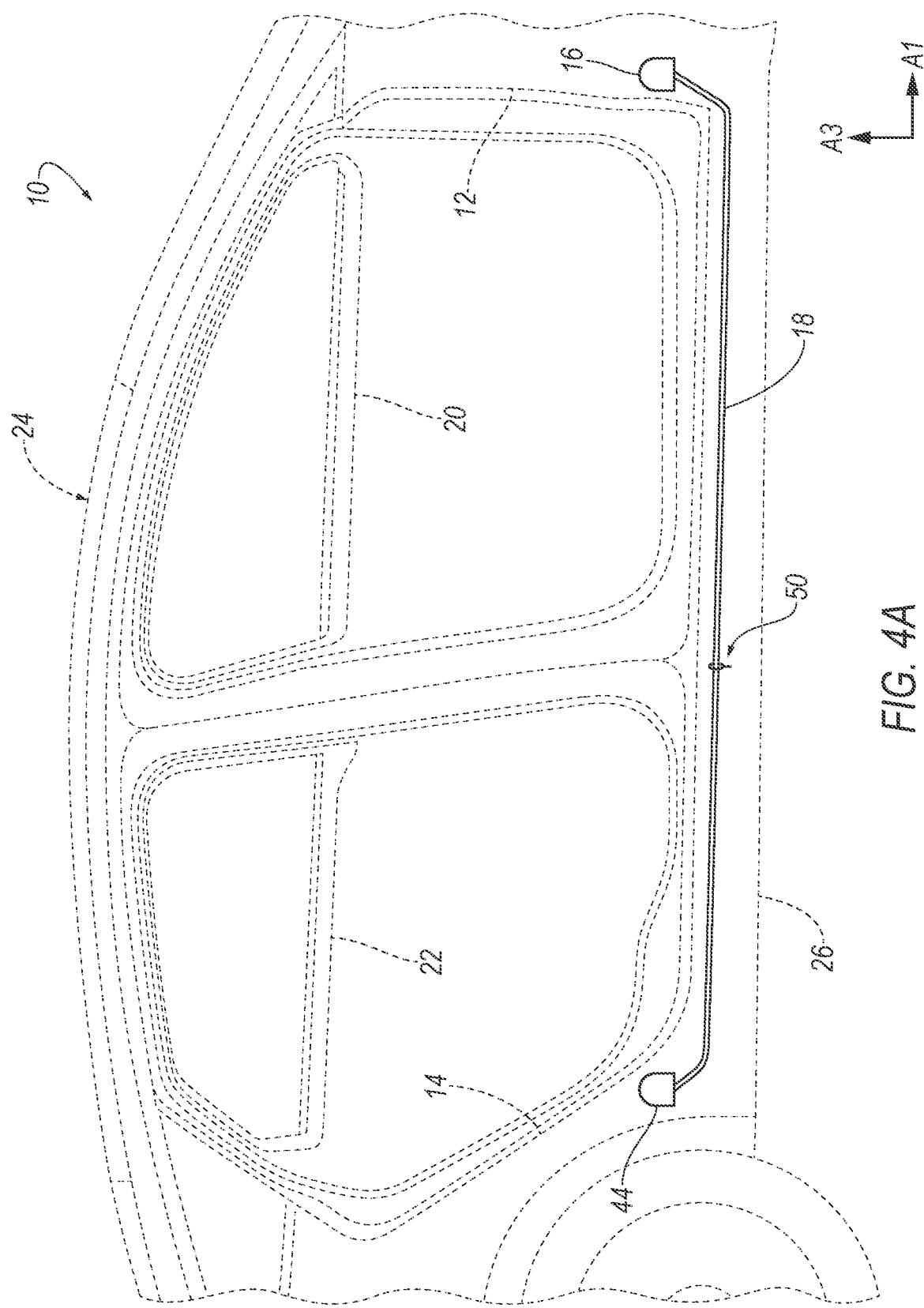
FIG. 4A is a side view of the vehicle including with another exemplary cable reinforcement including the cable in the stowed position and a second rotational actuator engaged with the cable.
Figure 4B:
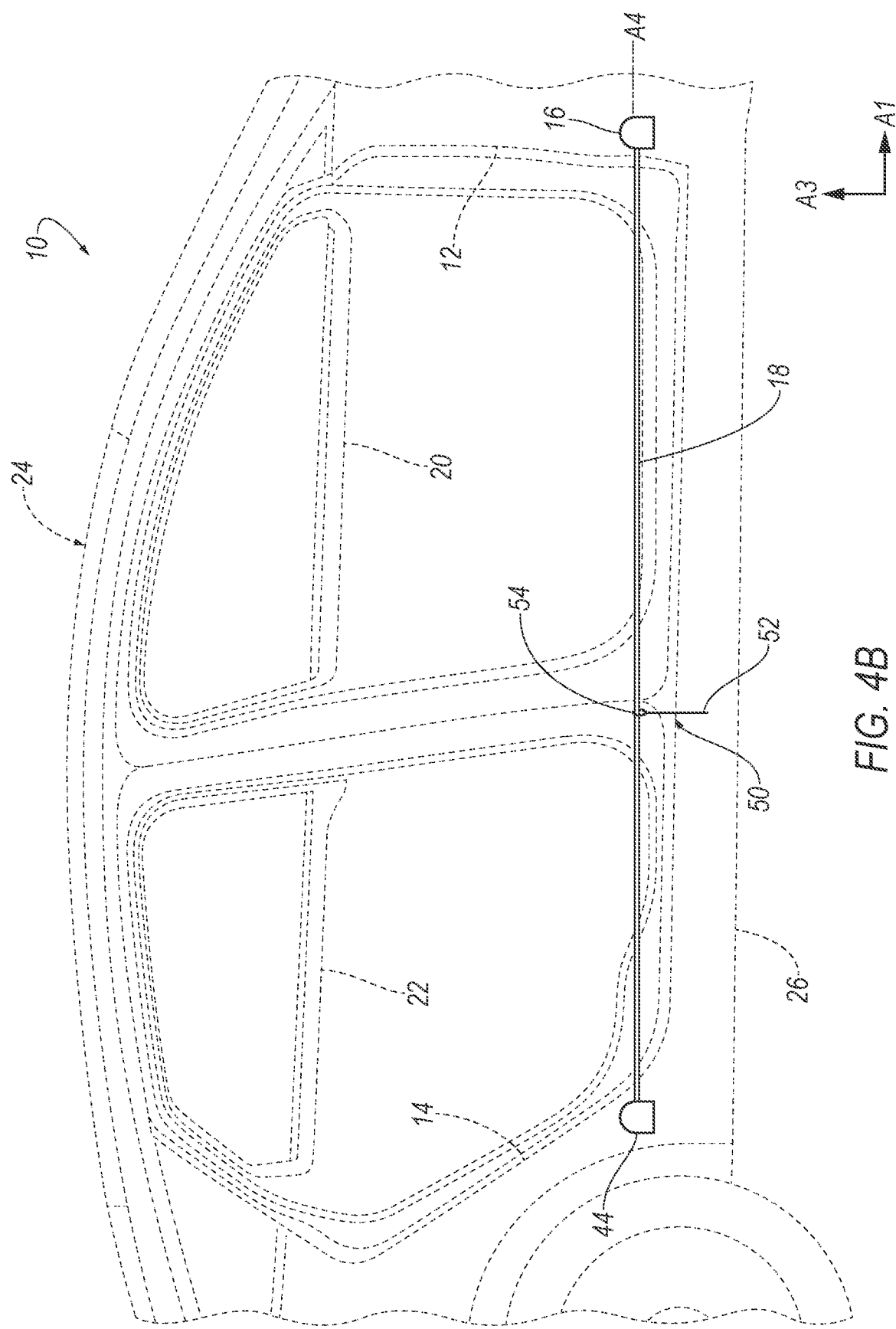
FIG. 4B is a side view of the vehicle including the exemplary cable reinforcement of FIG. 3A including the cable in the deployed position.
Figure 5A:
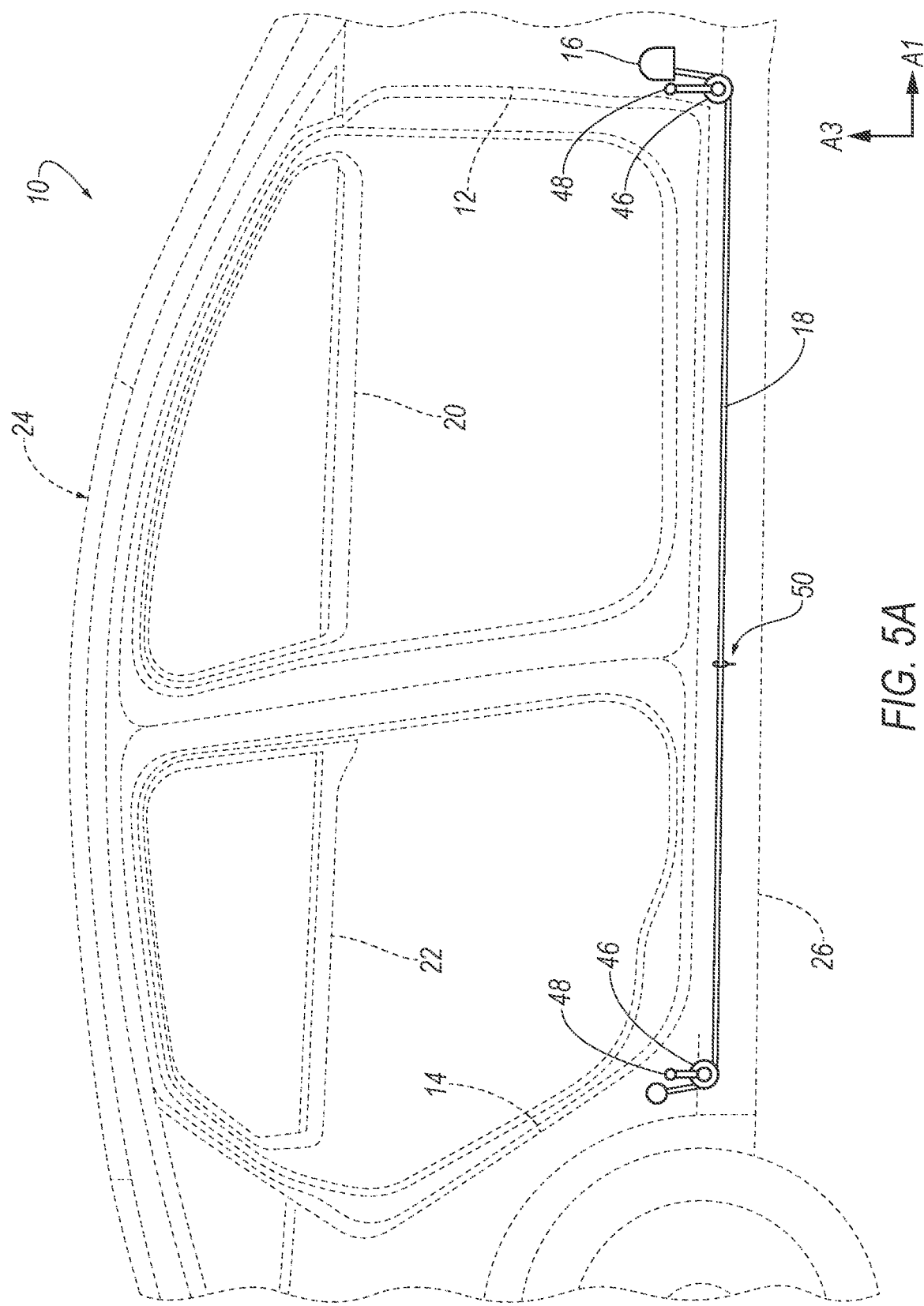
FIG. 5A is a side view of the vehicle with another exemplary cable reinforcement including the cable in the stowed position and moveable pulleys engaged with the cable.
Figure 5B:
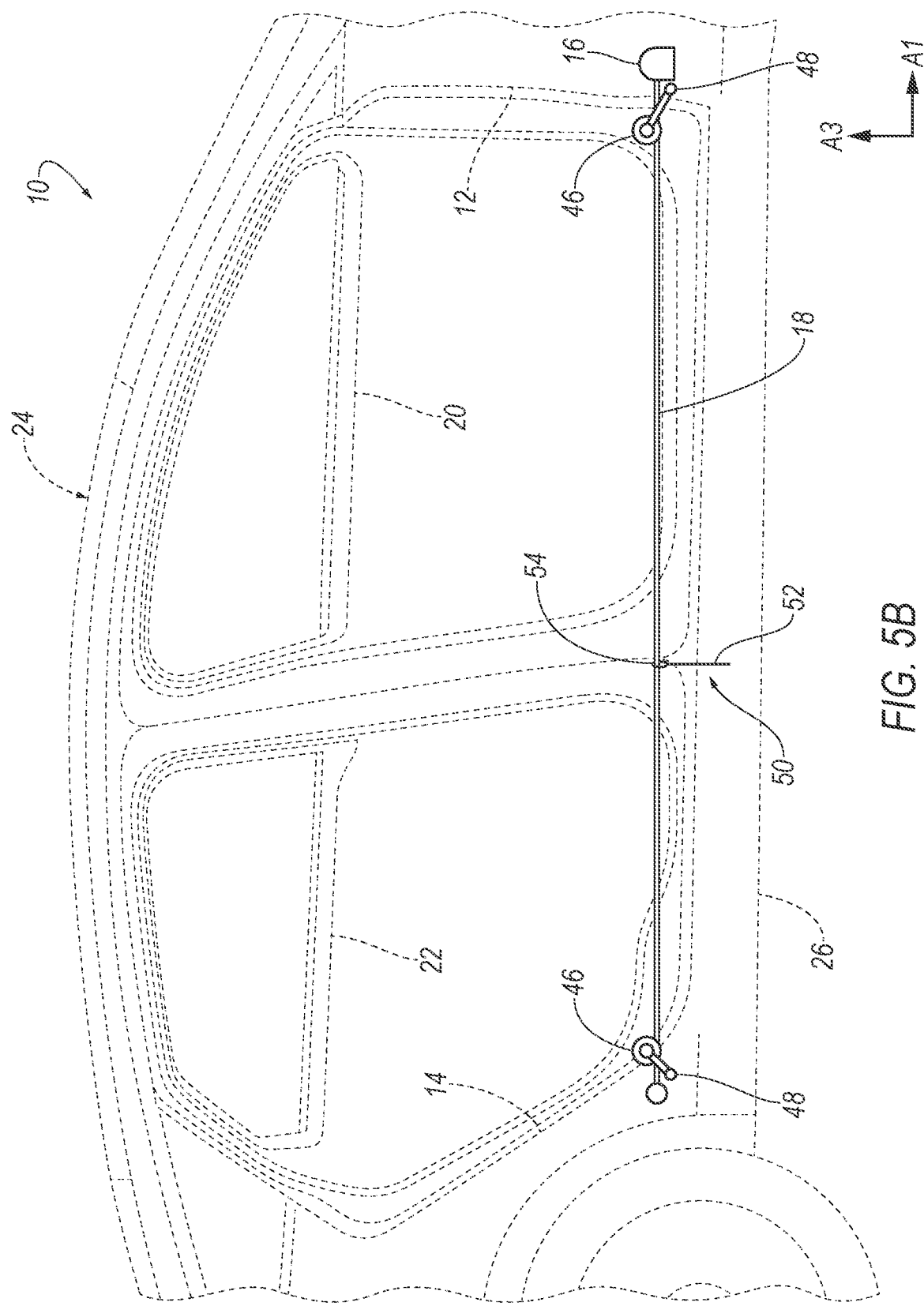
FIG. 5B is a side view of the vehicle including the exemplary cable reinforcement of FIG. 5A including the cable in the deployed position.

The rotational actuator 16 is configured to move the cable 18 from a stowed position, as shown in FIGS. 1, 2A, 4A, and 5A, to a deployed position, as shown in FIGS. 2B, 4B, and 5B. That is, the rotational actuator 16 is operable to pull the cable 18 along the longitudinal axis A1. Specifically, the rotational actuator 16 is positioned such that the axis of rotation for the drum 30 is generally parallel to the lateral axis A2 of the vehicle 10. In this context, "generally" means that the axis of rotation for the drum 30 extends generally along the lateral axis A2, even if the axis deviates from parallel. The rotational actuator 16 is actuated in response to a vehicle pre-impact, as discussed below. For example, the rotational actuator 16 may rotate the drum 30 in a first direction, e.g., counterclockwise. When the rotational actuator 16 rotates the drum 30 in the first direction, the drum 30 pulls the cable 18 in the first direction, and the cable 18 wraps around the drum 30.

The rotational actuator 16 may be configured to move the cable 18 from the deployed position to the stowed position. That is, the rotational actuator 16 may be configured to release tension in the cable 18. For example, the rotational actuator 16 may be actuated to release tension in the cable 18 in response to not detecting a vehicle side impact after detecting the vehicle pre-impact, as discussed below. For example, the rotational actuator 16 may rotate the drum 30 in a second direction, e.g., clockwise. The second direction is opposite the first direction. When the rotational actuator 16 rotates the drum 30 in the second direction, the cable 18 unwraps from around the drum 30 and tension in the cable 18 is released. In this situation, the cable 18 can be moved to the stowed position, e.g., by a moveably pulley 46 (as discussed below in regards to FIGS. 5A and 5B), another component of the vehicle 10, or gravity.

The rotational actuator 16 may include locking elements 32, 34 (see FIGS. 3A and 3B) engageable with each other to prevent the drum 30 from rotating in a second direction, e.g., counterclockwise, and releasing tension in the cable 18. When the cable 18 is in the stowed position, the locking elements 32, 34 are disengaged from each other. In this situation, the drum 30 can rotate about the axis of rotation for the drum 30. When the cable 18 is in the deployed position, the locking elements 32, 34 are engaged with each other, as shown in FIGS. 3A and 3B. In this situation, the drum 30 is locked, i.e., fixed, relative to the first pillar 12. That is, the cable 18 is maintained in the deployed position when the locking elements 32, 34 are engaged with each other. The locking elements 32, 34 may be releasable, e.g., to allow the drum 30 to rotate in the second direction, in response to not detecting a vehicle side-impact after detecting the vehicle pre-impact, as discussed below. The locking elements 32, 34 may be a pawl 32 and a ratchet 34, as shown in FIGS. 3A and 3B, or any other suitable type, such a locking pin and a hole.

The rotational actuator 16 may, for example, be any actuator that ignites a combustible material. For example, the rotational actuator 16 may include a pyrotechnic charge that produces gas or otherwise rapidly expands upon actuation. That is, the rotational actuator 16 may be pyrotechnically actuated. Specifically, the rotational actuator 16 may include a cylinder 36 and a piston 38 and pyrotechnic charge in the cylinder 36, as shown in FIG. 3B. The piston 38 is connected to a tether 40 that is wrapped around the drum 30, and the pyrotechnic charge is ignited to slide the piston 38 along the cylinder 36, i.e., moving the piston 38 and the tether 40 relative to the first pillar 12. In response to a vehicle pre-impact, as discussed further below, the rotational actuator 16 actuates to move the piston 38, which pulls the tether 40 and rotates the drum 30 in the first direction about the axis of rotation for the drum 30. In such an example, the locking elements 32, 34 may remain engaged to prevent the drum 30 from rotating in the second direction.

Alternatively, the rotational actuator 16 may include a motor 42, as shown in FIG. 3A. The motor 42 may be an electric motor. The motor 42 may be any suitable type of electric motor, e.g., a brushless DC motor, a brushed DC motor, a rotary magnetic motor, etc.

The motor 42 may be engaged with the drum 30 to rotate the drum 30 about the axis of rotation for the drum 30. The motor 42 may be engaged with the drum 30 in any suitable manner. For example, the motor 42 may be a friction drive motor that includes a wheel contacting the drum 30 to drive the drum 30 through friction contact. As another example, the motor 42 may include a gear that engages gear teeth circumferentially spaced about the drum 30. The motor 42 is configured to rotate the drum 30 in the first direction in response to a vehicle pre-impact, as discussed below.

Additionally, the motor 42 may be configured to rotate the drum 30 in the second direction in response to not detecting a vehicle side-impact after detecting the vehicle pre-impact, as discussed below. In this situation, the locking elements 32, 34 may be selectively releasable. Specifically, the locking elements 32, 34 may be released from each other prior to the motor 42 being actuated to rotate the drum 30 in the second direction.

The vehicle 10 may include a second rotational actuator 44 disposed at the second pillar 14, as shown in FIGS. 4A and 4B. The second rotational actuator 44 may be supported by the second pillar 14, e.g., in substantially the same manner as discussed above regarding the rotational actuator 16 being supported by the first pillar 12. The second rotational actuator 44 may be substantially identical to the rotational actuator 16 with the exception that the second rotational actuator 44 is configured to rotate in an opposite direction than the rotational actuator 16. That is, the rotational actuator 16 and the second rotational actuator 44 may be mirror images of each other about the lateral axis A2.

The second rotational actuator 44 may be configured to move the cable 18 between the stowed and deployed positions, e.g., in substantially the same manner as discussed above with regards to the rotational actuator 16. The second rotational actuator 44 may be actuated simultaneously to the rotational actuator 16, e.g., in response to the vehicle pre-impact and/or not detecting a vehicle side-impact after detecting a vehicle pre-impact.

In an example in which the rotational actuator 16 is configured to release tension in the cable 18, the vehicle 10 may include two moveable pulleys 46, as shown in FIGS. 5A and 5B. Each moveable pulley 46 may be disposed at one respective pillar 12, 14. Each moveably pulley 46 may be supported by the respective pillar 12, 14. For example, each moveably pulley 46 may include a spring 48 mounted to the respective pillar 12, 14. For example, the springs 48 may include locating elements, fasteners, etc., that engage the respective pillar 12, 14. Additionally, or alternatively, fasteners may engage the respective spring 48 and the respective pillar 12, 14 to mount the respective moveably pulley 46 to the respective pillar 12, 14. The springs 48 may be any suitable type of spring. For example, as shown in FIGS. 5A and 5B, the spring may be a torsional spring. Other suitable types include an extension spring, a compression spring, etc.

The moveable pulleys 46 may include a groove (not shown) that receives the cable 18. The moveably pulleys 46 may, for example, be rotatable about an axis (not shown) generally parallel to the lateral axis A2. That is, the moveably pulleys 46 may be rotatable in the first and second directions. In such an example, each moveably pulley 46 includes a shaft (not numbered) and a wheel (not numbered) rotatably supported on the shaft.

The moveably pulleys 46 are configured to guide that cable 18 to the stowed position when the rotational actuator 16 releases tension in the cable 18. For example, the springs 48 may bias the moveable pulleys 46 to maintain contact with the cable 18. That is, the springs 48 may exert a biasing force in a direction of the cable 18. The biasing force of the springs 48 provides sufficient force to move the cable 18 to the stowed position during actuation of the rotational actuator 16 in the second direction. That is, the springs 48 may bias the moveable pulley 46 to guide the cable 18 to the stowed position when the cable 18 is relaxed, i.e., lacks sufficient tension to be taut. The biasing force is less than the tension in the cable 18 when the cable 18 is in the deployed position, which allows the cable 18 to move the moveable pulleys 46 during deployment to the deployed position.

The cable 18 extends from the first pillar 12 to the second pillar 14. That is, the cable 18 extends across the front and rear doors 20, 22. The cable 18 includes one end (not shown) engaged with the rotational actuator 16, i.e., disposed at the first pillar 12, and another end (not numbered) spaced from the one end, i.e., disposed at the second pillar 14. The ends of the cable 18 may be generally aligned with each other relative to the vertical axis A3.

In an example in which the vehicle 10 lacks the second rotational actuator 44, the other end of the cable 18 is fixed relative to the second pillar 14. For example, the other end of the cable 18 may be connected directly, to indirectly via one or more intermediate components, to the second pillar 14 via, fasteners, welding, adhesive, etc., as shown in FIGS. 2A, 2B, 5A, and 5B. In an example in which the vehicle 10 includes the second rotational actuator 44, the other end of the cable 18 is engaged with the second rotational actuator 44, as shown in FIGS. 4A and 4B.

The cable 18 is designed, i.e., sized and shaped, to oppose door intrusion during a vehicle side impact. The cable 18 may, for example, include several strands of wire that are bonded, twisted, and/or braided together into the shape of a helix. The cable 18 may be designed to have a high tensile strength for transferring heavy loads between the pillars 12, 14. The cable 18 may have any suitable diameter. The cable 18 may be made of any suitable material such as metal, etc.

The cable 18 is moveable from the stowed position to the deployed position by the rotational actuator 16. When the rotational actuator 16 actuates in the first direction, the cable 18 wraps around the rotational actuator 16, e.g., the drum 30. In this situation, the rotational actuator 16 pulls the cable 18 taut, i.e., removes slack in the cable 18. That is, the rotational actuator 16 pulls the cable 18 to the deployed position during actuation of the rotational actuator 16 in the first direction. In an example in which the cable 18 includes the second rotational actuator 44, the cable 18 is moveable from the stowed position to the deployed position by the rotational actuator 16 actuating in the first direction and the second rotational actuator 44 actuating in the second direction, e.g., in substantially the same manner as discussed immediately above.

The cable 18 may be moveable from the deployed position to the stowed position. In an example in which the rotational actuator 16 is configured to rotate in the second direction, the cable 18 unwraps from the rotational actuator 16, e.g., the drum 30, when the rotational actuator 16 rotates in the second direction. In this situation, the rotational actuator 16 provides slack to the cable 18. That is, the rotational actuator 16 releases tension in the cable 18 during actuation in the second direction. In such an example, the moveable pulleys 46 can guide the cable 18 to the stowed position. In an example in which the cable 18 includes the second rotational actuator 44, the rotational actuator 16 is configured to rotate in the second direction, and the second rotational actuator 44 is configured to rotate in the first direction, the cable 18 is moveable from the deployed position to the stowed position, e.g., in substantially the same manner as discussed immediately above.

In the stowed position, the cable 18 may be routed along the rocker 26 of the vehicle 10, i.e., along the lower boundary of the one door opening, as shown in FIGS. 2A, 4A and 5A. The cable 18 may be concealed, e.g., by a carpet, a trim panel, etc. In other words, the cable 18, in the stowed position, may not be visible to an occupant during ingress, egress, and occupancy of the vehicle 10. In the stowed position, tension in the cable 18 is relaxed relative to the tension when the cable 18 is in the deployed position. For example, in the stowed position, the cable 18 may be relaxed, i.e., lack sufficient tensile force to be taut between the pillars 12, 14.

In the deployed position, the cable 18 extends across the one door opening and is spaced from the rocker 26, i.e., is disposed in the one door opening. The cable 18, in the deployed position, extends along an axis A4 generally parallel to the longitudinal axis A1, as shown in FIGS. 2B, 4B, and 5B. The cable 18 is under tension in the deployed position. For example, the cable 18 may be taut with tensile force between the pillars 12, 14. The tension in the cable 18 may be adjusted based on a number of rotations of the rotational actuator 16 (and second rotational actuator 44). For example, increasing the number of rotations of the rotational actuator 16 (and second rotational actuator 44) increases the amount of the cable 18 that is wrapped around the rotational actuator 16 (and second rotational actuator 44) thereby increasing the tension in the cable 18. The tension in the cable 18 may distribute a force applied by an object, e.g., during a vehicle side-impact, to the pillars 12, 14, which can assist in reducing the likelihood of door intrusion to the passenger cabin.

The vehicle 10 may include a secondary cable 50 disposed between the first and second pillars 12, 14, as shown in FIGS. 2A, 2B, and 4A-5B. The vehicle 10 may include any suitable number of secondary cables 50, e.g., one or more. The secondary cable 50 may be disposed at any suitable position between the first and second pillars 12, 14. In an example in which the vehicle 10 includes one secondary cable 50, the secondary cable 50 may be equidistant from the first and second pillars 12, 14. In an example in which the vehicle 10 includes a plurality of secondary cables 50, at least one of the secondary cables 50 may be disposed closer to one pillar 12, 14 than the other pillar 12, 14.

The secondary cable 50 is designed, i.e., sized and shaped, to reinforce the cable 18. That is, the secondary cable 50 supplements the cable 18 in opposing door intrusion during a vehicle side impact. The secondary cable 50 may, for example, include several strands of wire that are bonded, twisted, and/or braided together into the shape of a helix. The secondary cable 50 may be designed to have a high tensile strength for transferring heavy loads to the body 24, e.g., the rocker 26. The secondary cable 50 may have any suitable diameter. The secondary cable 50 may be made of any suitable material such as metal, etc.

The secondary cable 50 may extend from the rocker 26 (or any other suitable component of the body 24, e.g., the floor, a cross member, etc.) to the cable 18, as shown in FIGS. 2A, 2B, and 4A-5B. The secondary cable 50 may include a first end 52 and a second end 54 spaced from the first end 52. The first end 52 may be fixed relative to the rocker 26 (or any other suitable component of the body 24). For example, the first end 52 of the secondary cable 50 may be connected directly, to indirectly via one or more intermediate components, to the rocker 26 (or any other suitable component of the body 24) via, fasteners, welding, adhesive, etc.

The second end 54 of the secondary cable 50 may be engaged with the cable 18. For example, the second end 54 of the secondary cable 50 may include a loop, and the cable 18 may extend through the loop. As another example, the second end 54 of the secondary cable 50 may be connected to the cable 18, e.g., via welding.

The secondary cable 50 may extend generally perpendicular to the cable 18 when the cable 18 is in the deployed position. For example, the secondary cable 50 may along an axis (not shown) generally parallel to the vertical axis A3 when the cable 18 is in the deployed position. The secondary cable 50 may reinforce the cable 18 during the vehicle side impact by limiting movement of the cable 18 along the lateral axis A2. During the vehicle side-impact, the cable 18 may move along the lateral axis A2 due to forces from the object impacting the vehicle 10. In this situation, movement of the cable 18 along the lateral axis A2 may tension the secondary cable 50. When the secondary cable 50 is under tension, i.e., taut with tensile forces, the secondary cable 50 can transfer loads from the cable 18 to the rocker 26, which can assist in reducing the likelihood of door intrusion to the passenger cabin.

Figure 6:
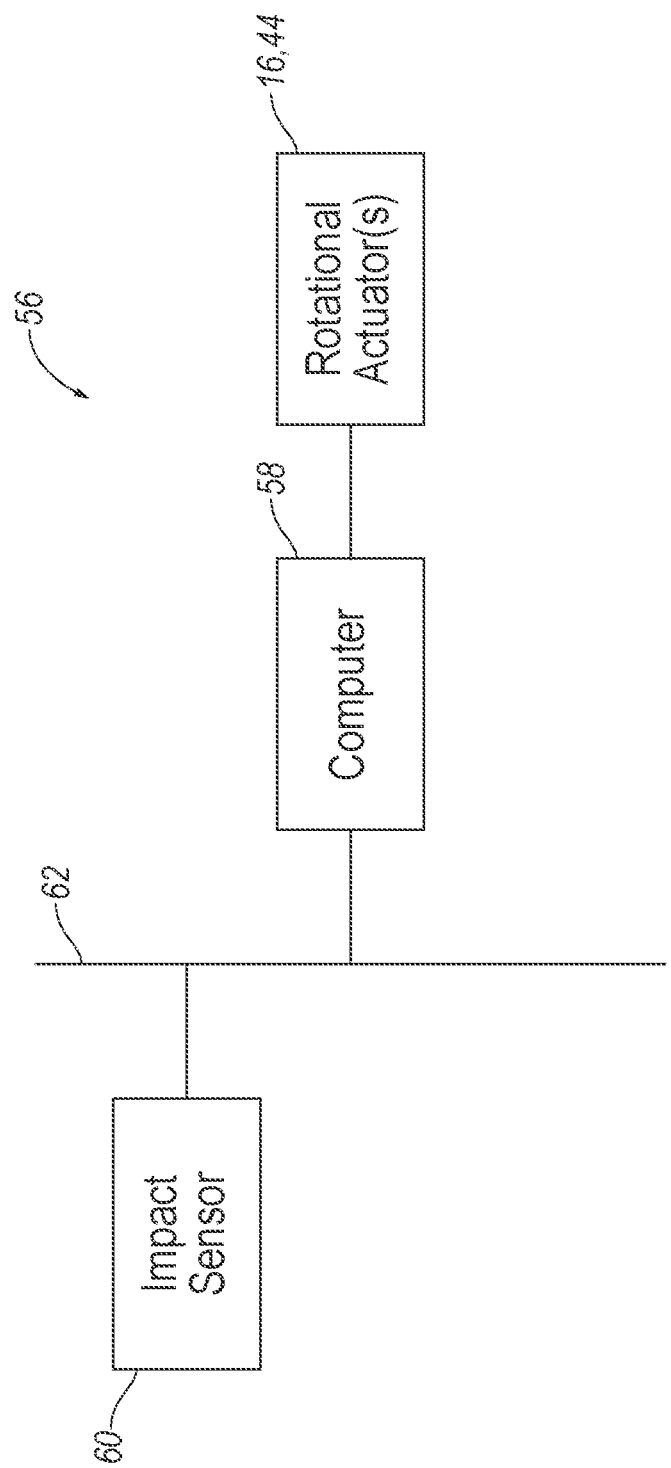
FIG. 6 is a block diagram of a control system for the vehicle.

With reference to FIG. 6, the vehicle 10 may include a control system 56. The control system 56 may include a computer 58, an impact detection sensor 60, and the rotational actuator 16 (and the second rotational actuator 44), in communication through a communication network 62.

The impact detection sensor 60 may be in communication with the computer 58. The impact detection sensor 60 may be of any suitable type, for example, post-contact sensors such as accelerometers, pressure sensors, and contact switches; and pre-impact detection sensors such as radar, lidar, and vision-sensing systems. The vision systems may include one or more cameras, CCD image sensors, CMOS image sensors, etc. The impact detection sensor 60 may be disposed in the vehicle 10.

The impact detection sensors 60 are programmed to detect the vehicle pre-impact. In other words, the impact detection sensors 60 may be configured to sense impact prior to impact, i.e., pre-impact sensing. When the impact detection sensor 60 sense the vehicle pre-impact occurs, the computer 58 may receive one or more signals from the impact detection sensor 60 indicating the vehicle pre-impact. Additionally, the impact detection sensors 60 may be programmed to detect the impact to the vehicle 10. When the vehicle side-impact occurs, the computer 58 may receive one or more signals from the impact detection sensors 60 indicating the vehicle side-impact.

The computer 58 may be a microprocessor-based computing device implemented via circuits, chips, or other electronic components. The computer 58 may include a processor, memory, etc. The memory of the computer 58 may store instructions executable by the processor and the processor may read the instructions from the memory and execute the instructions.

The control system 56 may transmit signals through the communication network 62 such as a computer area network (CAN) bus, Ethernet, Local Interconnect Network (LIN), and/or by any other wired or wireless communication network.

The computer 58 may be programmed to activate the rotational actuator 16, e.g., in the first direction, in response to detecting the vehicle pre-impact. For example, in response to receiving the signals from the impact detection sensor 60, the computer 58 may initiate actuation of the rotational actuator 16. In other words, in examples in which the impact detection sensor 60 detects a vehicle pre-impact, the computer 58 may send a signal to actuate the rotational actuator 16. In this situation, the rotational actuator 16 actuates, which moves the cable 18 from the stowed position to the deployed position.

In an example in which the vehicle 10 includes the second rotational actuator 44, the computer 58 may be programmed to activate the second rotational actuator 44, e.g., in the second direction, in response to detecting the vehicle pre-impact, e.g., in substantially the same manner as discussed immediately above. In this situation, the computer 58 may actuate the rotational actuator 16 and the second rotational actuator 44 simultaneously.

In an example in which the rotational actuator 16 is configured to release tension in the cable 18, the computer 58 may be programmed to activate the rotational actuator 16 in the second direction in response to not detecting a vehicle side-impact after detecting the vehicle pre-impact. For example, upon detecting the vehicle pre-impact, the computer 58 can initiate a timer. A duration of the timer can be stored, e.g., in a memory of the computer 58. The duration of the timer can be determined empirically, e.g., based on testing that allows for determining a maximum amount of time a pre-impact can be detected prior to a vehicle side-impact. In response to not receiving signals from the impact detection sensor 60 prior to expiration of the timer, the computer 58 can determine that no vehicle side-impact occurred. In this situation, the computer 58 may initiate actuation of the rotational actuator 16. In other words, in examples in which the impact detection sensor 60 does not detect a vehicle side-impact, the computer 58 may send a signal to actuate the rotational actuator 16. In this situation, the rotational actuator 16 actuates, e.g., in the second direction, to release tension in the cable 18. The moveable pulleys 46 may guide the cable 18 from the deployed position to the stowed position.

In an example in which the vehicle 10 includes the second rotational actuator 44 and the second rotational actuator 44 is configured to rotate in the first direction, the computer 58 may be programmed to activate the second rotational actuator 44 in the first direction in response to not detecting a vehicle side-impact after detecting the vehicle pre-impact, e.g., in substantially the same manner as discussed immediately above. In this situation, the computer 58 may actuate the rotational actuator 16 and the second rotational actuator 44 simultaneously.

Computing devices, such as the computer 58, generally include computer-executable instructions, where the instructions may be executable by one or more computing devices such as those listed above. computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

During a vehicle side-impact, an object may impact a door 20, 22 of the vehicle 10, and cause the door 20, 22 to move inward along the lateral axis A2, i.e., towards the passenger cabin. The rotational actuator 16 is actuated to move the cable 18 to the deployed position in response to detecting a vehicle pre-impact. Since the cable 18 is in the deployed position, i.e., under tension, prior to the vehicle side-impact, the cable 18 distributes a force from the impact to the first and second pillars 12, 14. Specifically, the cable 18 remains attached to the first and second pillars 12, 14 during the vehicle side-impact. The tension of the cable 18 results in the cable 18 opposing movement of the object towards the passenger cabin to reduce the likelihood of door intrusion during the vehicle side-impact.

The disclosure has been described in an illustrative manner, and it is to be understood that the terminology which has been used is intended to be in the nature of words of description rather than of limitation. The adjectives "first," "second," etc., are used herein as identifiers and are not used to indicate order or importance. Many modifications and variations of the present disclosure are possible in light of the above teachings, and the disclosure may be practiced otherwise than as specifically described.

The invention claimed is:

1. A vehicle, comprising:
a first pillar and a second pillar spaced from the first pillar along a vehicle-longitudinal axis;
a rotational actuator disposed at the first pillar, the rotational actuator being fixed relative to the first pillar; and
a cable engaged with the rotational actuator and elongated along the vehicle-longitudinal axis to the second pillar, the cable being moveable to a deployed position by the rotational actuator and being under tension in the deployed position;
the rotational actuator including a drum and an electric motor, the electric motor being configured to rotate the drum in a first direction to move the cable to the deployed position and to rotate the drum in a second direction to release the cable to a stowed position;
a moveable pulley engaged with the cable, the moveable pulley being disposed at one of the first pillar or the second pillar and being configured to guide the cable to a stowed position when the rotational actuator releases tension in the cable.

2. The vehicle of claim 1, further comprising a second rotational actuator disposed at the second pillar and fixed relative to the second pillar, wherein the cable is engaged with the second rotational actuator.

3. The vehicle of claim 2, further comprising a sensor and a computer in communication with the sensor, the computer having a processor and a memory storing instructions executable by the processor to control actuation of the rotational actuator and the second rotational actuator based on the sensor detecting a pre-impact.

4. The vehicle of claim 3, wherein the instructions further include instructions to control actuation of the rotational actuator and the second rotational actuator based on the sensor not detecting an impact.

5. The vehicle of claim 1, wherein the cable includes an end disposed at the second pillar, the end being fixed relative to the second pillar.

6. The vehicle of claim 1, further comprising a rocker extending from the first pillar to the second pillar, and a secondary cable extending from the rocker to the cable.

7. The vehicle of claim 6, wherein the secondary cable includes a first end fixed relative to the rocker and a second end engaged with the cable.

8. The vehicle of claim 6, wherein the secondary cable is disposed equidistant from the first pillar and the second pillar.

9. The vehicle of claim 6, wherein, when the cable is in the deployed position, the secondary cable extends generally perpendicular to the cable.

10. The vehicle of claim 1, wherein the moveable pulley includes a spring mounted to the one of the first pillar or the second pillar, the springs being configured to bias the moveable pulley towards the stowed position.

11. The vehicle of claim 1, wherein, when the cable is in a stowed position, tension in the cable is relaxed relative to tension when the cable is in the deployed position.

12. The vehicle of claim 1, further comprising a sensor and a computer in communication with the sensor, the computer having a processor and a memory storing instructions executable by the processor to control actuation of the rotational actuator based on the sensor detecting a pre-impact.

13. The vehicle of claim 12, wherein the instructions further include instructions to control actuation of the rotational actuator based on the sensor not detecting an impact.

14. The vehicle of claim 1, wherein the cable in the deployed position extends along an axis generally parallel to the vehicle-longitudinal axis.

15. A vehicle, comprising:
a first pillar and a second pillar spaced from the first pillar along a vehicle-longitudinal axis;
a rotational actuator disposed at the first pillar, the rotational actuator being fixed relative to the first pillar; and
a cable engaged with the rotational actuator and elongated along the vehicle-longitudinal axis to the second pillar, the cable being moveable to a deployed position by the rotational actuator and being under tension in the deployed position;
a rocker extending from the first pillar to the second pillar; and
a secondary cable extending from the rocker to the cable.

16. The vehicle of claim 15, wherein the secondary cable includes a first end fixed relative to the rocker and a second end engaged with the cable.

17. The vehicle of claim 15, wherein, when the cable is in the deployed position, the secondary cable extends generally perpendicular to the cable.

18. A vehicle, comprising:
a first pillar and a second pillar spaced from the first pillar along a vehicle-longitudinal axis;
a rotational actuator disposed at the first pillar, the rotational actuator being fixed relative to the first pillar; and
a cable engaged with the rotational actuator and elongated along the vehicle-longitudinal axis to the second pillar, the cable being moveable to a deployed position by the rotational actuator and being under tension in the deployed position;

two moveable pulleys each engaged with the cable, each moveable pulley being disposed at one respective pillar and being configured to guide the cable to a stowed position when the rotational actuator releases tension in the cable.

19. The vehicle of claim 18, wherein each moveable pulley includes a spring mounted to the respective pillar, the springs being configured to bias the moveable pulleys towards the stowed position.

\* \* \* \* \*